(12) United States Patent
Yamazaki et al.

(10) Patent No.: US 10,036,304 B2
(45) Date of Patent: Jul. 31, 2018

(54) LEADING-AIR TYPE TWO-STROKE AIR-COOLED ENGINE

(71) Applicant: YAMABIKO CORPORATION, Tokyo (JP)

(72) Inventors: Takahiro Yamazaki, Tokyo (JP); Hidekazu Tsunoda, Tokyo (JP); Hisato Osawa, Tokyo (JP); Shunsuke Ueda, Tokyo (JP)

(73) Assignee: Yamabiko Corporation, Tokyo (JP)

( * ) Notice: Subject to any disclaimer, the term of this patent is extended or adjusted under 35 U.S.C. 154(b) by 91 days.

(21) Appl. No.: 15/384,336

(22) Filed: Dec. 20, 2016

(65) Prior Publication Data

US 2017/0175615 A1 Jun. 22, 2017

(30) Foreign Application Priority Data

Dec. 21, 2015 (JP) .................................. 2015-248754

(51) Int. Cl.
*F02B 33/04* (2006.01)
*F02B 25/02* (2006.01)
(Continued)

(52) U.S. Cl.
CPC ............... *F02B 25/02* (2013.01); *F01P 5/04* (2013.01); *F02B 25/00* (2013.01); *F02B 25/22* (2013.01);
(Continued)

(58) Field of Classification Search
CPC ..... F02B 2075/025; F02B 25/00; F02B 25/02
See application file for complete search history.

(56) References Cited

U.S. PATENT DOCUMENTS 1,793,444 A * 2/1931 Johnson .................. F02B 25/00
123/47 R
2,134,285 A * 10/1938 Kipfer ..................... F02B 25/00
123/65 BA
(Continued)

FOREIGN PATENT DOCUMENTS

| CN | 105804858 A | 7/2016 |
| EP | 2770180 A2 | 8/2014 |

(Continued)

OTHER PUBLICATIONS

Extended European Search Report issued in corresponding European Patent Application No. 16205858.0 dated Mar. 3, 2017 (5 pages).

*Primary Examiner* — Marguerite McMahon
*Assistant Examiner* — Tea Holbrook
(74) *Attorney, Agent, or Firm* — Kilyk & Bowersox, P.L.L.C.

(57) ABSTRACT

To balance a "low-temperature scavenging effect" and a "high-temperature scavenging effect." A scavenging system applicable to a leading-air type two-stroke air-cooled engine has a low-temperature scavenging passage and a high-temperature scavenging passage. The low-temperature scavenging passage has first and second passages and includes scavenging ports at upper end parts thereof. The high-temperature scavenging passage has first and second passages and includes scavenging ports at upper end parts thereof. An air is filled through a piston groove into the passages. The low-temperature scavenging passage has a relatively small capacity. The high-temperature scavenging passage has a relatively large capacity.

13 Claims, 6 Drawing Sheets

(51) Int. Cl.
  *F01P 5/04* (2006.01)
  *F02B 25/22* (2006.01)
  *F02B 29/04* (2006.01)
  *F02B 33/44* (2006.01)
  *F02B 75/02* (2006.01)
  *F02B 25/00* (2006.01)

(52) U.S. Cl.
  CPC ........ *F02B 29/045* (2013.01); *F02B 29/0425* (2013.01); *F02B 33/04* (2013.01); *F02B 33/44* (2013.01); *F02B 75/02* (2013.01); *F02B 2075/025* (2013.01); *Y02T 10/146* (2013.01)

(56) References Cited

U.S. PATENT DOCUMENTS

| | | | |
|---|---|---|---|
| 5,361,738 A * | 11/1994 | Iida | F02N 3/02 123/182.1 |
| 6,289,856 B1 | 9/2001 | Noguchi | |
| 6,367,432 B1 * | 4/2002 | Araki | F02B 25/14 123/65 P |
| 6,571,756 B1 * | 6/2003 | Rosskamp | F02B 25/22 123/73 A |
| 6,857,402 B2 | 2/2005 | Schlossarczyk et al. | |
| 6,880,503 B2 | 4/2005 | Rosskamp | |
| 6,962,132 B2 | 11/2005 | Hoche et al. | |
| 2002/0139326 A1 * | 10/2002 | Araki | F02B 25/22 123/73 PP |
| 2006/0005795 A1 | 1/2006 | Yuasa et al. | |
| 2010/0037874 A1 | 2/2010 | Laydera-Collins | |

FOREIGN PATENT DOCUMENTS

| | | |
|---|---|---|
| JP | H11-009051 A | 1/1999 |
| JP | 3313373 B2 | 8/2002 |

* cited by examiner

LEADING-AIR TYPE TWO-STROKE AIR-COOLED ENGINE

CROSS-REFERENCE TO RELATED APPLICATION

The present application claims priority from Japanese Patent Application No. 2015-248754, filed Dec. 21, 2015, which is incorporated herein by reference.

FIELD OF THE INVENTION

The present invention relates to a leading-air type two-stroke air-cooled engine.

BACKGROUND OF THE INVENTION

Two-stroke air-cooled engines are used for portable working machines such as bush cutters, chain saws, and power blowers (Patent Document 1). In development of the two-stroke air-cooled engines, efforts are made to comply with environmental regulations. A typical example thereof is a leading-air type two-stroke engine (Patent Documents 2 to 5). A leading-air type engine is also referred to as a "stratified scavenging engine."

The leading-air type two-stroke air-cooled engine introduces an air into a combustion chamber in an early phase of a scavenging stroke and subsequently introduces a fuel-air mixture in a crank chamber into a combustion chamber. This kind of an engine includes a scavenging passage communicating with the combustion chamber and the crank chamber. The scavenging passage is filled with an air from an upper part thereof. The air is supplied to the upper part of the scavenging passage through a piston groove (Patent Documents 2 to 5).

The leading-air type two-stroke air-cooled engine introduces the air accumulated in the scavenging passage into the combustion chamber in the early phase of the scavenging stroke. By using this leading-air in a scavenging stroke, an HC component in exhaust gas can advantageously be reduced.

FIG. 6 accompanying this description corresponds to FIG. 3 of Patent Document 3. Reference numeral 1 shown in FIG. 6 denotes a leading-air type two-stroke air-cooled engine. The engine 1 is a single-cylinder engine.

Reference numeral 2 denotes an air-cooling fan. The engine 1 is forcibly cooled by the air-cooling fan 2. An air-cooling fan is included not only in the shown engine but also in two-stroke air-cooled engines employed in portable working machines. A cylinder 6 housing a piston 4 is made of an aluminum alloy excellent in heat transference.

The cylinder 6 houses the piston 4 in a reciprocable manner. The piston 4 makes up a combustion chamber 8. The piston 4 is coupled through a connecting rod 10 to a crankshaft 12, and engine output is output through the crankshaft 12.

The air-cooling fan 2 is attached to one end part 12a of the crankshaft 12. For example, in the case of a chain saw, the engine output is output from the other end 12b of the crankshaft 12. In the case of a bush cutter, the air-cooling fan 2 is attached to the one end part 12a of the crankshaft 12, and the engine output is output form the one end part 12a.

Passages 14, 16 on the one and the other sides shown on the right and left in FIG. 6 are scavenging passages. These scavenging passages 14, 16 are located opposite to each other. The scavenging passage 14, 16 on the one and the other sides respectively have lower ends communicating with the crank chamber 18 and upper ends communicating with scavenging ports 20, 22 on the one and the other sides. The scavenging ports 20, 22 on the one and the other sides are opened and closed by the piston 4.

In the conventional example shown in FIG. 6, the one passage 14 and the other passage 16 are arranged opposite to each other in a directly opposite relationship. However, this is merely exemplification, and the one passage 14 and the other passage 16 are somewhat offset in a circumferential direction of a cylinder bore in some conventional examples.

The one and the other scavenging passages 14, 16 are supplied with air from upper parts thereof. In particular, the air is filled through a piston groove 24 formed in a circumferential surface of the piston 4 and the scavenging ports 20, 22 into the scavenging passages 14, 16. In the early phase of the scavenging stroke, the air stored in the scavenging passages 14, 16 is discharged through the scavenging ports 20, 22 to the combustion chamber 8. Subsequently, a fuel-air mixture pressurized in the crank chamber 18 is supplied through the scavenging passages 14, 16 and the scavenging ports 20, 22 to the combustion chamber 8.

The one scavenging passage 14 is located on the air-cooling fan side of the cylinder 6, and the other scavenging passage 16 is located on the opposite side.

PRIOR ART DOCUMENTS

Patent Document 1: Japanese Laid-Open Patent Publication No. 11-9051
Patent Document 2: U.S. Pat. No. 6,962,132 B2
Patent Document 3: Japanese Patent No. 3313373
Patent Document 4: U.S. Pat. No. 6,857,402B
Patent Document 5: U.S. Pat. No. 6,880,503B In the conventional leading-air type two-stroke air-cooled engines, the fan-side scavenging passage 14 and the other scavenging passage 16 located on the opposite side have been designed based on the same design concept. In particular, in the conventional design concept, the scavenging passages 14, 16 opposite to each other have the same capacity. The present inventors had doubts about the scavenging passages 14, 16 opposite to each other that had been designed based on the same design concept in terms of capacity, and measured respective temperatures at upper parts of the scavenging passages 14, 16 opposite to each other.

An implemented measurement method is described as follows.

(1) Temperature sensors were disposed on the cylinder 6.
(2) The temperature sensors were disposed at positions in upper parts of the scavenging passages 14, 16 on the fan side and the opposite side. Therefore, the temperature sensors were disposed in respective locations adjacent to the scavenging ports 20, 22.

A temperature difference existed between the fan-side scavenging passage 14 and the opposite-side scavenging passage 16. The temperature of the fan-side scavenging passage 14 was lower than the temperature of the opposite-side scavenging passage 16. Although varying depending on differences in displacement and design of engines, the temperature difference was several dozen degrees C.

The temperature difference of several dozen degrees C. is a non-negligible numerical value from the viewpoint of thermal expansion of gas. This means that the air density of the fan-side scavenging passage 14 at a lower temperature is relatively "high". In other words, this means that the air density of the scavenging passage 16 at a higher temperature is relatively "low".

From the temperature measurement described above, it is considered that in the conventional leading-air type two-stroke air-cooled engines, air with different volume densities were discharged from the scavenging passages 14, 16 opposite to each other. This means that unbalance occurred between a "low-temperature scavenging effect" from the scavenging passage 14 on the low temperature side (fan side) and a "high-temperature scavenging effect" from the scavenging passage 16 on the high temperature side. Based on this verification result, the present inventors conceived the present invention.

SUMMARY OF THE INVENTION

An object of the present invention is to provide a leading-air type two-stroke air-cooled engine capable of enhancing a scavenging efficiency.

Another object of the present invention is to provide a leading-air type two-stroke air-cooled engine capable of balancing a "low-temperature scavenging effect" and a "high-temperature scavenging effect."

According to the present invention, the technical problem described above is solved by a leading-air type two-stroke air-cooled engine introducing an air into a combustion chamber in an early phase of a scavenging stroke and subsequently introducing a fuel-air mixture in a crank chamber into the combustion chamber for scavenging, the engine comprising:

a low-temperature scavenging passage communicating with the crank chamber and the combustion chamber and having the communication with the combustion chamber opened and closed by a piston; and a high-temperature scavenging passage located opposite to the low-temperature scavenging passage, the high-temperature scavenging passage communicating with the crank chamber and the combustion chamber and having the communication with the combustion chamber opened and closed by the piston, the high-temperature scavenging passage having a temperature during engine operation higher than that of the low-temperature scavenging passage, the high-temperature scavenging passage having a capacity larger than that of the low-temperature scavenging passage.

In the present invention, the low-temperature and high-temperature scavenging passages located opposite to each other are "asymmetric" in terms of capacity. Therefore, from the viewpoint of capacity, the high-temperature scavenging passage is filled with a relatively larger amount of air in the present invention. In other words, the low-temperature scavenging passage is filled with a relatively smaller amount of air.

As a result, a balance can be achieved in the air discharged from the low-temperature and high-temperature scavenging passages to the combustion chamber. This balance enables improvements in the gas exchange and the scavenging efficiency of the combustion chamber.

Preferably, the capacities of the low-temperature and high-temperature scavenging passages are preferably designed such that the amounts of air filled in the low-temperature and high-temperature scavenging passages are equalized in terms of mass.

The low-temperature and high-temperature scavenging passages are filled with air partway in the longitudinal direction of the scavenging passages. Therefore, the low-temperature and high-temperature scavenging passages each have an air located in an upper portion and a fuel-air mixture located in a lower portion communicating with the crank chamber. The terms "upper" and "lower" are based on well-known technical terms "top dead center (TDC)" and "bottom dead center (BDC)" related to the engine.

When the boundary between the air and the fuel-air mixture is referred to as an "air filling line" in the low-temperature and high-temperature scavenging passages, the "asymmetry" described above may exist in the upper portions from the air filling line in terms of the capacity thereof between the low-temperature scavenging passage and the high-temperature scavenging passage. In other words, in the low-temperature and high-temperature scavenging passages, the lower portions from the air filling line may have "asymmetry" or "symmetry" in terms of the capacity thereof.

Other objects of the present invention and function effects of the present invention will become apparent from detailed description of preferred embodiments described later.

DETAILED DESCRIPTION OF THE PRESENT INVENTION

Before describing a preferred embodiment of the present invention with reference to the accompanying drawings, the principle of the present invention will hereinafter be described.

Figure 1:
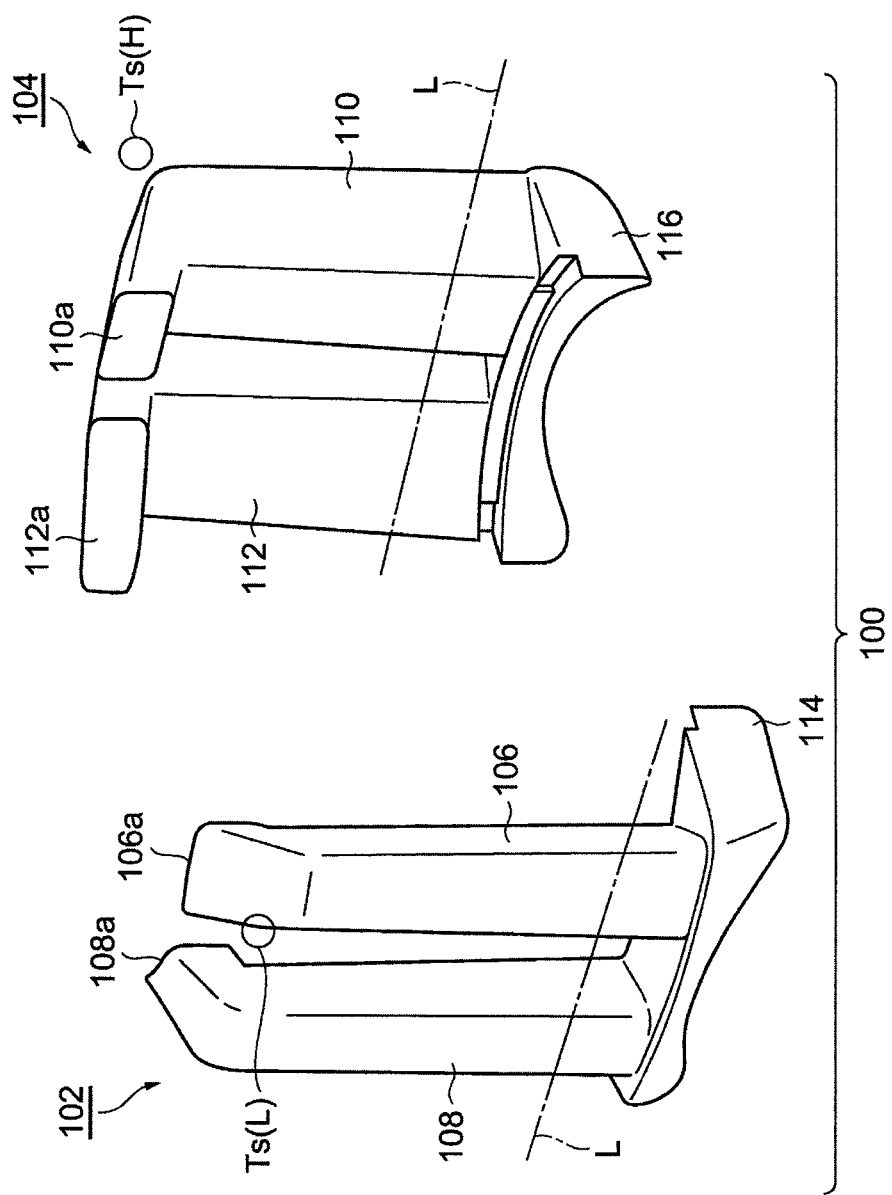
FIG. 1 shows a diagram for explaining a low-temperature scavenging passage and a high-temperature scavenging passage included in a scavenging system of a first example adoptable for an engine according to the present invention.
Figure 2:
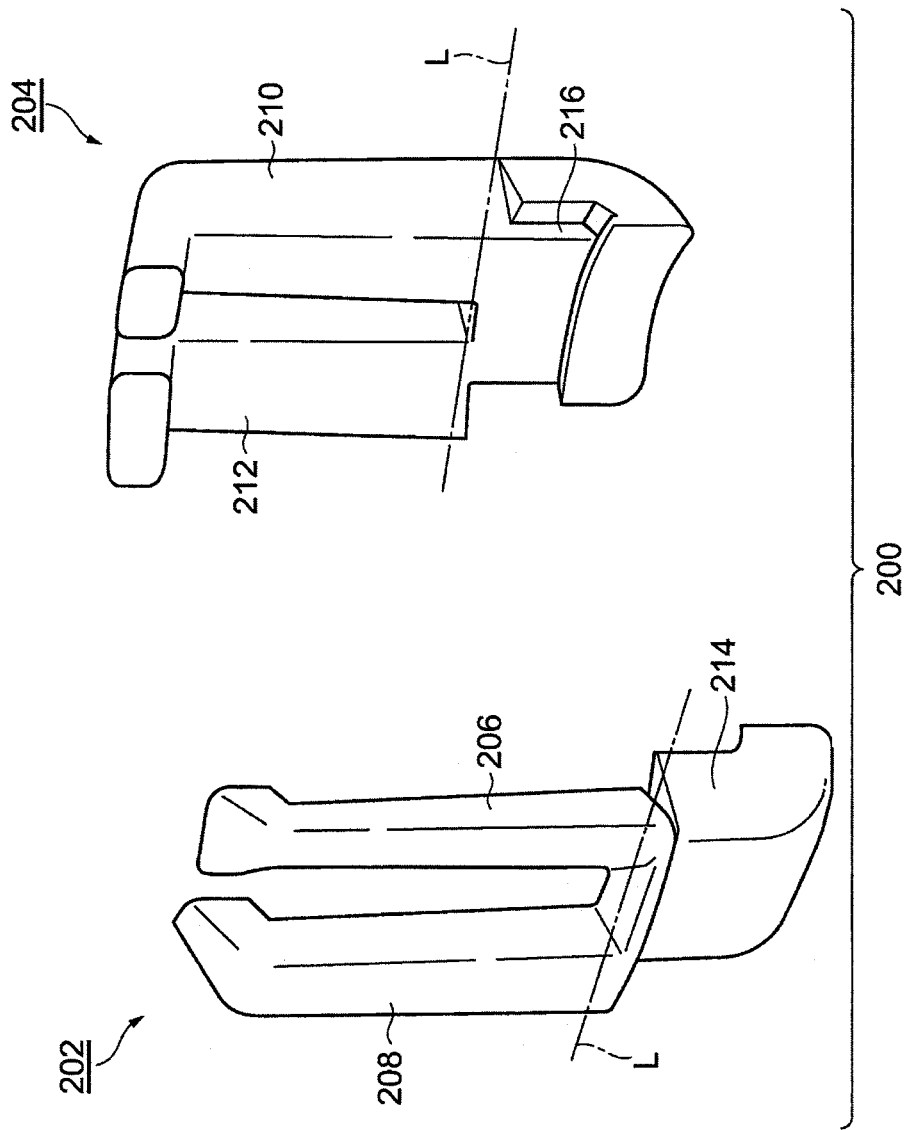
FIG. 2 shows a diagram for explaining a low-temperature scavenging passage and a high-temperature scavenging passage included in a scavenging system of a second example adoptable for the engine according to the present invention.

FIGS. 1 and 2 show low-temperature and high-temperature scavenging passages included in an engine of an embodiment. The low-temperature and high-temperature scavenging passages shown in FIGS. 1 and 2 are preferably applied to the leading-air type two-stroke air-cooled engines disclosed in Patent Documents 2 to 5. Therefore, Patent Document 2 to 5 are applied to and incorporated in this description in its entirety. The engines disclosed in Patent Documents 2 to 5 are single-cylinder engines.

Figure 6:
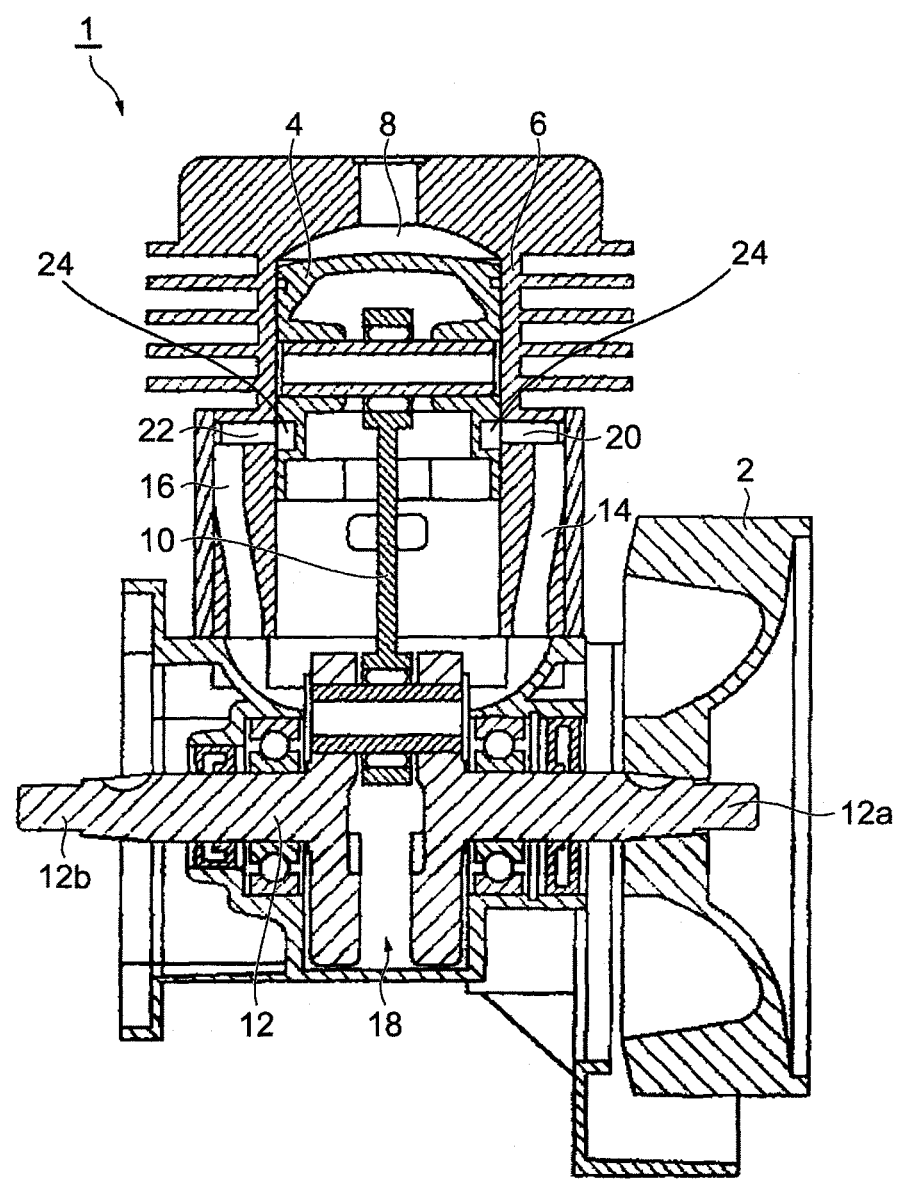
FIG. 6 shows a longitudinal sectional view of a conventional leading-air type two-stroke air-cooled engine.

In the description of the low-temperature and high-temperature scavenging passages disclosed in FIGS. 1 and 2, the elements described with reference to FIG. 6 are denoted by reference numerals added to these elements. FIG. 6 should be referred to as needed.

Reference numeral 100 shown in FIG. 1 denotes a scavenging system of a first example. The scavenging system 100 has a low-temperature scavenging passage 102 and a high-temperature scavenging passage 104. The low-temperature scavenging passage 102 and the high-temperature scavenging passage 104 are located opposite to each other.

The low-temperature scavenging passage 102 has first and second passages 106, 108. The high-temperature scavenging passage 104 has first and second passages 110, 112.

Generally speaking, "top dead center (TDC)" and "bottom dead center (BDC)" are well known as technical terms for engines. Describing by using terms "upper" and "lower" based on "top" and "bottom" included in these technical terms, the low-temperature scavenging passage 102 has scavenging ports 106a, 108a in an upper end part. The scavenging ports 106a, 108a communicate with a combustion chamber 8 (FIG. 6) and are opened and closed by a piston 4 (FIG. 6). The piston 4 has a piston groove 24 (FIG. 6) corresponding to the scavenging ports 106a, 108a in a circumferential surface thereof. An air is filled through the piston groove 24 into the low-temperature scavenging passage 102.

The lower ends of the first and second passages 106, 108 of the low-temperature scavenging passage 102 communicate with a common inlet portion 114. This common inlet portion 114 on the low-temperature side faces a crank chamber 18 (FIG. 6).

Although the low-temperature scavenging passage 102 communicates through the common inlet portion 114 with the crank chamber 18 in the first example shown in FIG. 1, the lower end parts of the first and second passages 106, 108 in a modification example may each directly communicate with the crank chamber 18.

The high-temperature scavenging passage 104 has scavenging ports 110a, 112a in an upper end part. The scavenging ports 110a, 112a communicate with the combustion chamber 8 (FIG. 6) and are opened and closed by the piston 4 (FIG. 6). The piston 4 has the piston groove 24 (FIG. 6) corresponding to the scavenging ports 110a, 112a in the circumferential surface thereof. An air is filled through the piston groove 24 into the high-temperature scavenging passage 104. The lower ends of the first and second passages 110, 112 of the high-temperature scavenging passage 104 communicate with a common inlet portion 116. This common inlet portion 116 on the high-temperature side faces the crank chamber 18 (FIG. 6).

Although the high-temperature scavenging passage 104 communicates the common inlet portion 116 with the crank chamber 18 in the first example shown in FIG. 1, the lower end parts of the first and second passages 110, 112 in a modification example may each directly communicate with the crank chamber 18. Reference numeral L of FIG. 1 denotes an air filling line.

As can be seen immediately from comparison between the low-temperature scavenging passage 102 (the first and second passages 106, 108) and the high-temperature scavenging passage 104 (the first and second passages 110, 112), the low-temperature scavenging passage 102 is relatively thin, and the high-temperature scavenging passage 104 is relatively thick.

In this embodiment, the low-temperature scavenging passage 102 is located on then air-cooling fan side and the high-temperature scavenging passage 104 is located opposite to the low-temperature scavenging passage 102. Because of this difference in arrangement position, the low-temperature scavenging passage 102 has a temperature relatively lower than the high-temperature scavenging passage 104.

Reference numeral Ts of FIG. 1 denotes a temperature sensor. The temperature sensors Ts are disposed on a cylinder 6 (FIG. 6) so as to measure a temperature difference between the low-temperature scavenging passage 102 and the high-temperature scavenging passage 104. Specifically, a low-temperature temperature sensor Ts(L) is disposed on the scavenging port 106a or 108a of the low-temperature scavenging passage 102, and a high-temperature temperature sensor Ts(H) is disposed on the scavenging port 110a or 112a of the high-temperature scavenging passage 104.

As a result of measurement in engines of approx. 20 cc to approx. 45 cc displacement, a temperature difference between the low-temperature scavenging passage 102 and the high-temperature scavenging passage 104 was 30° C. to 40° C.

With this temperature difference in mind, engines described in Table 1 were designed such that the mass of a first air discharged from the low-temperature scavenging passage 102 and the mass of a second air discharged from the high-temperature scavenging passage 104 are made substantially the same in the early phase of the scavenging stroke. In Table 1, "CF passage 102" means the low-temperature scavenging passage 102. "OP passage 104" means the high-temperature scavenging passage 104.

In Table 1, the capacity of the low-temperature scavenging passage 102 and the capacity of the high-temperature scavenging passage 104a are described in terms of a capacity of a portion upper than the air filling line L. The capacity of the upper portion is referred to as an "effective capacity". The position of the shown air filling line L is merely a conceptual position. It should be understood that the height position thereof is different in each of engines to be manufactured.

TABLE 1

| engine displacement (DP) | 20 cc | 25 cc | 35 cc | 45 cc |
|---|---|---|---|---|
| effective capacity of CF passage 102 | 1.5 cc | 1.6 cc | 3.7 cc | 5.7 cc |
| effective capacity of OP passage 104 | 2.2 cc | 2.0 cc | 3.8 cc | 6.2 cc |
| effective capacity ratio between CF passage 102 and OP passage 104 | 68% | 80% | 97.4% | 91.9% |

Table 1 describes a first effective capacity of the low-temperature scavenging passage 102 ("CF passage 102") and a second effective capacity of the high-temperature scavenging passage 104 ("OP passage 104") obtained based on the temperature difference actually measured by the temperature sensors Ts(L), Ts(H) (FIG. 1) arranged on the upper part of the cylinder 6 (FIG. 6).

In engine design, a variety of numerical values are determined in consideration of various elements and parameters. A temperature around an engine varies due to a type and a required performance of a working machine equipped with the engine and arrangement positions of a centrifugal clutch, an air cleaner, and a carburetor related to the engine. Therefore, in the application of the present invention, the capacity ratio between the low-temperature scavenging passage 102 and the high-temperature scavenging passage 104 may be optimized based on the temperature difference measured at arbitrary positions around the low-temperature scavenging passage 102 and the high-temperature scavenging passage 104.

With respect to the first effective capacity of the low-temperature scavenging passage 102 and the second effective capacity of the high-temperature scavenging passage 104, the capacity ratio between the effective capacity of the low-temperature scavenging passage 102 and the effective capacity of the high-temperature scavenging passage 104 in practical design is preferably 65% to 98%, more preferably 80% to 95%.

This enables a reduction in the influence of the temperature difference between the low-temperature scavenging passage 102 and the high-temperature scavenging passage 104, i.e., the influence of expansion of air in the scavenging stroke. In particular, a balance can be achieved between the scavenging by the first air discharged from the low-temperature scavenging passage 102 and the scavenging by the second air discharged from the high-temperature scavenging passage 104. This balance can enhance the efficiency of scavenging by air in the early phase of the scavenging stroke and the fuel-air mixture can subsequently be filled into the combustion chamber to make the gas exchange more preferable.

Reference numeral 200 shown in FIG. 2 denotes a scavenging system of a second example. The scavenging system 200 has a low-temperature scavenging passage 202 and a high-temperature scavenging passage 204. The low-temperature scavenging passage 202 and the high-temperature scavenging passage 204 are located opposite to each other. The low-temperature scavenging passage 202 is located on the side of an air-cooling fan 2 (FIG. 6). The high-temperature scavenging passage 204 is located on the opposite side.

The low-temperature scavenging passage 202 has first and second passages 206, 208 and has a common inlet portion 214 with which the lower ends of the first and second passages 206, 208 communicate. The high-temperature scavenging passage 204 has first and second passages 210, 212 and has a common inlet portion 216 with which the lower ends of the first and second passages 210, 212 communicate.

The above configuration of the second scavenging system 200 is the same as the configuration of the scavenging system 100 of the first example. A difference from the first example is that both the common inlet portion 214 of the low-temperature scavenging passage 202 and the common inlet portion 216 of the high-temperature scavenging passage 204 included in the scavenging system 200 of the second example have capacities larger than those of the common inlet portion 114 and the common inlet portion 116 included in the first scavenging system 100.

In a modification example of the second scavenging system 200, the low-temperature scavenging passage 202 may include the first and second passages 206, 208 having a form of branching from the common inlet portion 214 into two passages, and the high-temperature scavenging passage 204 may include the first and second passages 210, 212 having a form of branching from the common inlet portion 216 into two passages. Reference numeral L of FIG. 2 denotes the air filling line.

Figure 3:
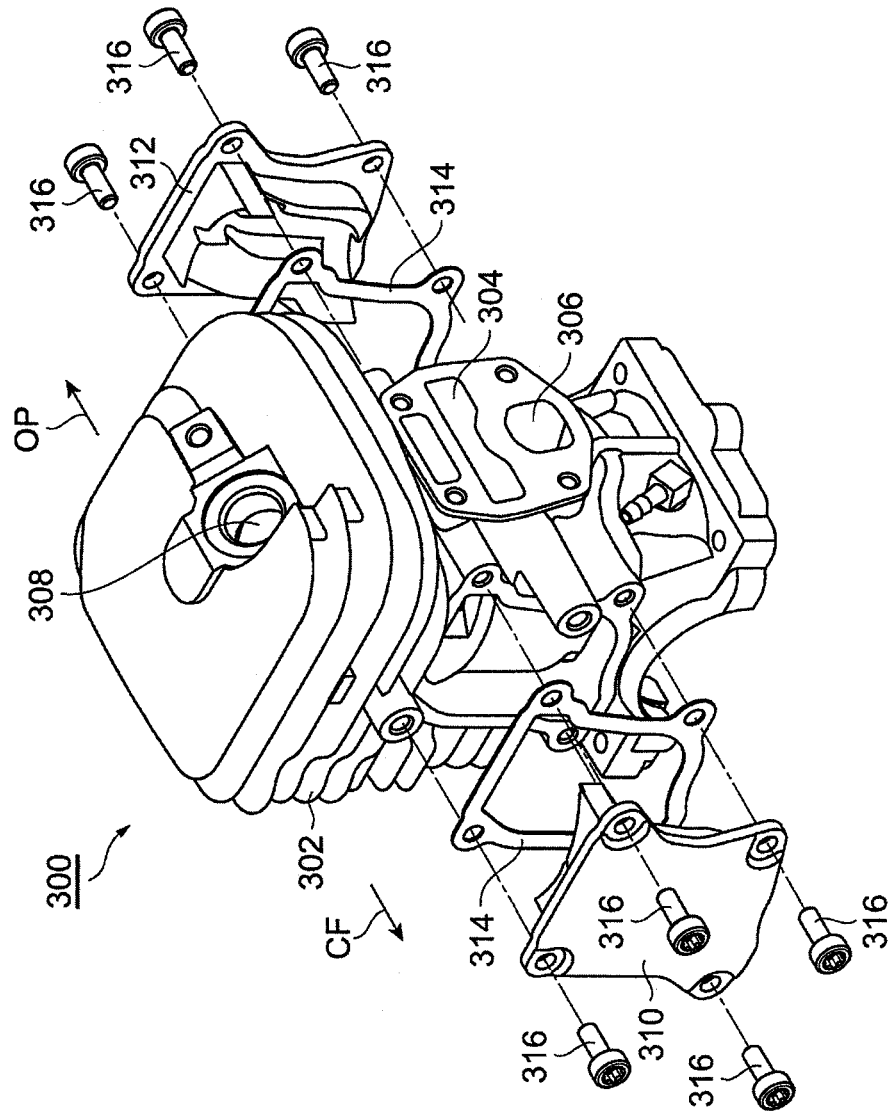
FIG. 3 shows an exploded perspective view of a cylinder included in an engine of an embodiment according to the present invention.
Figure 4:
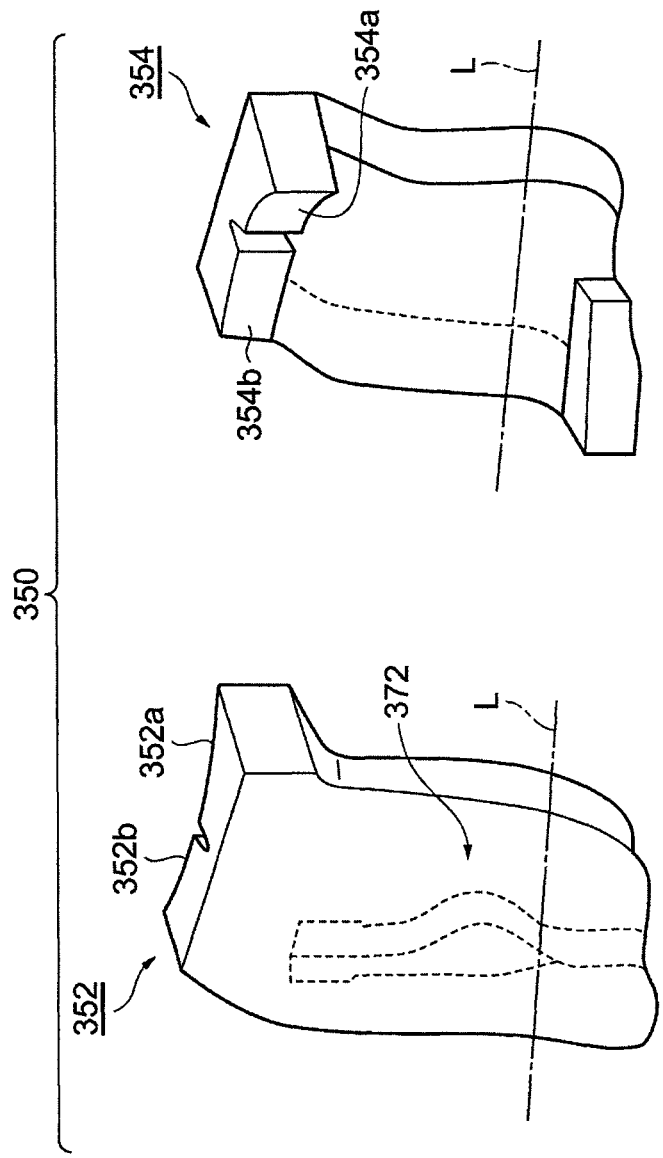
FIG. 4 shows a diagram for explaining a low-temperature scavenging passage and a high-temperature scavenging passage included in the cylinder shown in FIG. 3.
Figure 5:
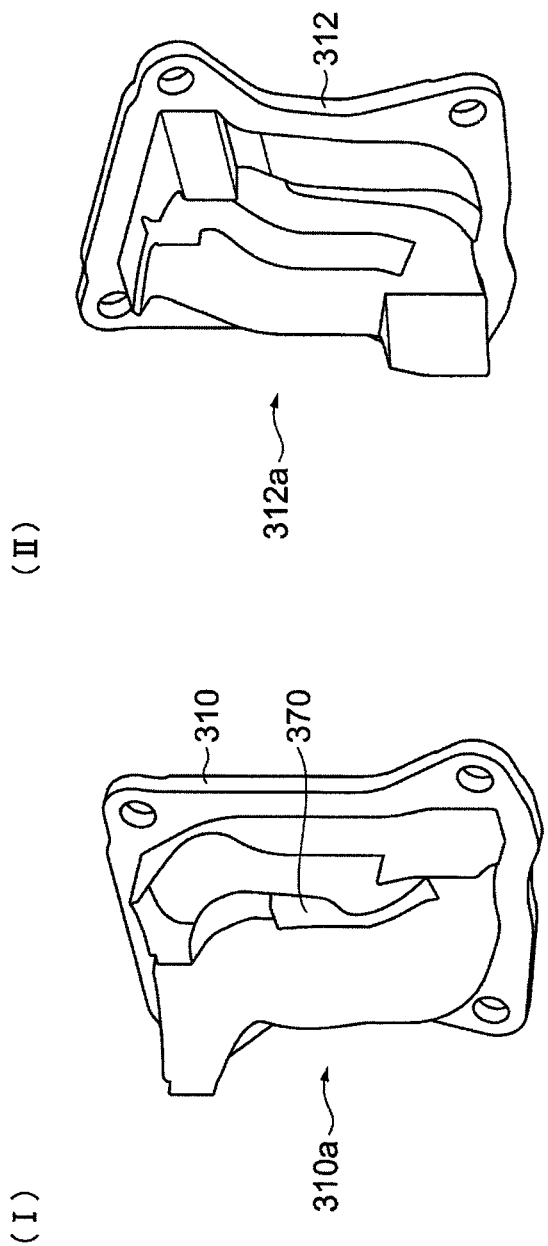
FIG. 5 shows (I) a diagram of a low-temperature cylinder plug defining the shape of the low-temperature scavenging passage and (II) a diagram of a high-temperature cylinder plug defining the shape of the high-temperature scavenging passage.

Embodiment (FIGS. 3 to 5)

FIG. 3 relates to a leading-air type two-stroke air-cooled engine of an embodiment and is a perspective view of a cylinder of the engine. The engine of this embodiment is a single-cylinder engine and is preferably applied to a chain saw. Referring to FIG. 3, the reference numeral 300 denotes a cylinder. The cylinder 300 has a cylinder body 302 into which a piston (not shown) is fit and inserted. Reference numeral 304 denotes an air port receiving a leading-air supplied from an air cleaner. Reference numeral 306 denotes a fuel-air mixture port receiving a fuel-air mixture supplied from a carburetor. Reference numeral 308 denotes an attachment hole for an ignition plug.

Continuing to refer to FIG. 3, an arrow CF indicates a direction of location of the air-cooling fan 2 (FIG. 6). An arrow OP indicates a direction of engine output in the case of the chain saw. These two directions CF, OP are opposite to each other across the cylinder axis.

A low-temperature cylinder plug 310 is attached to a side surface in the direction of the arrow CF of the cylinder body 302. A high-temperature cylinder plug 312 is attached to a side surface in the direction of the arrow OP of the cylinder body 302.

The low-temperature and high-temperature cylinder plugs 310, 312 are cast products made of an aluminum alloy, for example. In a modification example, the cylinder plugs 310, 312 may be resin molded products or molded products made of light metal, for example, a magnesium alloy. The cylinder plugs 310, 312 are fixed via seal materials 314 to the cylinder body 302. Reference numeral 316 denotes fastening bolts and the fastening bolts 316 are used for fixing the cylinder plugs 310, 312. The low-temperature cylinder plug 310 and the high-temperature cylinder plug 312 are members defining the passage shapes of the scavenging passages.

The above configuration is the same as the conventional leading-air type two-stroke air-cooled engines.

FIG. 4 shows a scavenging system 350 included in the leading-air type two-stroke air-cooled engine of the embodiment. The scavenging system 350 includes a low-temperature scavenging passage 352 and a high-temperature scavenging passage 354. The low-temperature scavenging passage 352 is formed by the low-temperature cylinder plug 310. The high-temperature scavenging passage 354 is formed by the high-temperature cylinder plug 312. The low-temperature scavenging passage 352 has the full capacity of 5.7 cc. The high-temperature scavenging passage 354 has the full capacity of 6.2 cc. The low-temperature scavenging passage 352 and the high-temperature scavenging passage 354 are each made up of one passage extending vertically (in a cylinder axial direction).

A first full capacity of the low-temperature scavenging passage 352 is smaller than a second full capacity of the high-temperature scavenging passage 354. The capacity ratio between the first full capacity of the low-temperature scavenging passage 352 and the second full capacity of the high-temperature scavenging passage 354 is approx. 98%. This difference in capacity is substantially generated by a difference between a shape of a first passage shape forming surface 310a ((I) of FIG. 5) of the low-temperature cylinder plug 310 and a shape of a second passage shape forming surface 312a ((II) of FIG. 5) of the high-temperature cylinder plug 312.

FIG. 5 includes a perspective view of the low-temperature cylinder plug 310 viewed from the first passage shape forming surface 310a side (FIG. 5(I)) and a perspective view of the high-temperature cylinder plug 312 viewed from the second passage shape forming surface 312a side. In comparison between FIG. 4 and FIG. 5 as well as between (I) and (II) of FIG. 5, the first passage shape forming surface 310a of the low-temperature cylinder plug 310 has a protruding part 370 (FIG. 5(1)) reducing a passage cross-sectional area of the low-temperature scavenging passage 352 at an intermediate portion in the vertical direction (cylinder axial direction). Therefore, the low-temperature scavenging passage 352 has a concave part (recess) 372 at the intermediate portion in the cylinder axial direction so that a passage effective cross-sectional area of the corresponding portion is made smaller (FIG. 4). In comparison, the high-temperature scavenging passage 354 is not narrowed at the intermediate portion in the vertical direction (cylinder axial direction).

The presence/absence of the concave part 372 substantially appears as a difference between the full capacity (5.7 cc) of the low-temperature scavenging passage 352 and the full capacity (6.2 cc) of the high-temperature scavenging passage 354.

Referring to FIG. 4, the low-temperature scavenging passage 352 is filled with an air to the air filling line L. In other words, the fuel-air mixture coming into the low-temperature scavenging passage 352 from the crank chamber 18 (FIG. 6) is filled only in the portion lower than the air filling line L because of the air coming in from the upper part of the low-temperature scavenging passage 352.

The concave part (recess) 372 described above is positioned at an axial intermediate portion of the cylinder body 302. Preferably, the concave part 372 is positioned near the air filling line L and above the air filling line L. In the first full capacity of the low-temperature scavenging passage 352, this concave part 372 makes a first effective capacity above the air filling line L smaller than a second effective capacity of the high-temperature scavenging passage 354.

The leading-air type two-stroke air-cooled engine has the low-temperature scavenging passage 312 filled with an air through scavenging ports 352a, 352b. In the scavenging stroke, the air in the low-temperature scavenging passage 352 is discharged through the scavenging ports 352a, 352b to the combustion chamber 8 and, subsequently, the fuel-air mixture in the crank chamber 18 (FIG. 6) is discharged through the low-temperature scavenging passage 352 and the scavenging ports 352a, 352b to the combustion chamber 8. The same applies to the high-temperature scavenging passage 354. In FIG. 4, the scavenging ports of the high-temperature scavenging passage 354 are denoted by reference numerals 354a, 354b.

Therefore, as is the case with the high-temperature scavenging passage 354, the air of the low-temperature scavenging passage 352 comes in and out through the scavenging ports 352a, 352b at the upper end of the low-temperature scavenging passage 352. Because this portion is not narrowed in the passage cross-sectional area by the concave part 372, the presence of the concave part (recess) 372 does not block the entrance and exit of the air. Therefore, with regard to the correction of unbalance in scavenging efficiency associated with the temperature difference between the low-temperature scavenging passage 352 and the high-temperature scavenging passage 354, the capacity ratio between the low-temperature scavenging passage 352 and the high-temperature scavenging passage 354 can be optimized without reducing the scavenging efficiency of the low-temperature scavenging passage 352.

1 leading-air type engine
2 air-cooling fan
4 piston
6 cylinder
8 combustion chamber
12 crankshaft
12a one end part (fan side) of the crankshaft
12b the other end of the crankshaft
18 crank chamber
24 piston groove
L air filling line
100 scavenging system of the first example
102 low-temperature scavenging passage
104 high-temperature scavenging passage
200 scavenging system of the second example
202 low-temperature scavenging passage
204 high-temperature scavenging passage
300 cylinder included in the engine of the embodiment
302 cylinder body (engine main body)
304 air port
306 fuel-air mixture port
310 low-temperature cylinder plug
310a passage shape forming surface of the low-temperature cylinder plug
312 high-temperature cylinder plug
312a passage shape forming surface of the high-temperature cylinder plug
350 scavenging system of the engine of the embodiment
352 low-temperature scavenging passage
352a, 352b scavenging port of the low-temperature scavenging passage
354 high-temperature scavenging passage
354a, 354b scavenging port of the high-temperature scavenging passage
370 protruding part of the low-temperature cylinder plug
372 concave part (recess) of the low-temperature scavenging passage

What is claimed is:

1. A leading-air type two-stroke air-cooled engine introducing an air into a combustion chamber in an early phase of a scavenging stroke and subsequently introducing a fuel-air mixture in a crank chamber into the combustion chamber for scavenging, the engine comprising:
   a low-temperature scavenging passage communicating with the crank chamber and the combustion chamber and having the communication with the combustion chamber opened and closed by a piston; and
   a high-temperature scavenging passage located opposite to the low-temperature scavenging passage, the high-temperature scavenging passage communicating with the crank chamber and the combustion chamber and having the communication with the combustion chamber opened and closed by the piston,
   the high-temperature scavenging passage having a temperature during engine operation higher than that of the low-temperature scavenging passage,
   the high-temperature scavenging passage having a capacity larger than that of the low-temperature scavenging passage.

2. The leading-air type two-stroke air-cooled engine of claim 1, wherein
   in each of the low-temperature scavenging passage and the high-temperature scavenging passage, an air is located in an upper portion from an air filling line in each the scavenging passage along with a fuel-air mixture located in a lower portion, and wherein
   in comparison between a first effective capacity of the upper portion from the air filling line in the low-temperature scavenging passage and a second effective capacity of the upper portion from the air filling line in the high-temperature scavenging passage, the first effective capacity of the low-temperature scavenging passage is smaller than the second effective capacity of the high-temperature scavenging passage.

3. The leading-air type two-stroke air-cooled engine of claim 2, wherein a capacity ratio between the first effective capacity of the low-temperature scavenging passage and the second effective capacity of the high-temperature scavenging passage is 65% to 98%.

4. The leading-air type two-stroke air-cooled engine of claim 2, wherein a capacity ratio between the first effective capacity of the low-temperature scavenging passage and the second effective capacity of the high-temperature scavenging passage is 80% to 95%.

5. The leading-air type two-stroke air-cooled engine of claim 2, wherein the low-temperature scavenging passage has a recess located above and near the air filling line, and wherein the recess narrows a passage cross-sectional area of the low-temperature scavenging passage.

6. The leading-air type two-stroke air-cooled engine of claim 5, further comprising
an engine main body,
a low-temperature cylinder plug attached to the engine main body and defining a passage shape of the low-temperature scavenging passage, and
a high-temperature cylinder plug attached to the engine main body and defining a passage shape of the high-temperature scavenging passage.

7. The leading-air type two-stroke air-cooled engine of claim 6, wherein
in comparison between a first passage shape forming surface of the low-temperature cylinder plug and a second passage shape forming surface of the high-temperature cylinder plug, the first passage shape forming surface of the low-temperature cylinder plug has a protruding part, and wherein
the protruding part narrows the passage cross-sectional area of the low-temperature scavenging passage.

8. The leading-air type two-stroke air-cooled engine of claim 2, further comprising an air-cooling fan attached to one end part of an engine output shaft, wherein an engine output is taken out from the other end of the engine output shaft, wherein
the low-temperature scavenging passage is located on the air-cooling fan side, and wherein
the high-temperature scavenging passage is located on the engine output side.

9. The leading-air type two-stroke air-cooled engine of claim 2, further comprising an air-cooling fan attached to one end part of an engine output shaft, wherein an engine output is taken out from the one end part.

10. The leading-air type two-stroke air-cooled engine of claim 1, further comprising
an engine main body,
a low-temperature cylinder plug attached to the engine main body and defiling a passage shape of the low-temperature scavenging passage, and
a high-temperature cylinder plug attached to the engine main body and defining a passage shape of the high-temperature scavenging passage.

11. The leading-air type two-stroke air-cooled engine of claim 1, wherein
in comparison between a first passage shape forming surface of the low-temperature cylinder plug and a second passage shape forming surface of the high-temperature cylinder plug, the first passage shape forming surface of the low-temperature cylinder plug has a protruding part, and wherein
the protruding part narrows the passage cross-sectional area of the low-temperature scavenging passage.

12. The leading-air type two-stroke air-cooled engine of claim 1, further comprising an air-cooling fan attached to one end part of an engine output shaft, wherein an engine output is taken out from the other end of the engine output shaft, wherein
the low-temperature scavenging passage is located on the air-cooling fan side, and wherein
the high-temperature scavenging passage is located on the engine output side.

13. The leading-air type two-stroke air-cooled engine of claim 1, further comprising an air-cooling fan attached to one end part of an engine output shaft, wherein an engine output is taken out from the one end part.

* * * * *